United States Patent [19]
Thompson et al.

[11] Patent Number: 6,145,613
[45] Date of Patent: Nov. 14, 2000

[54] PIVOT ASSEMBLY FOR A VEHICLE CAB

[75] Inventors: Graham Thompson, Waterloo, Iowa; Milan Dimitrijevic, Mannheim, Germany

[73] Assignee: Deere & Company, Moline, Ill.

[21] Appl. No.: 09/286,853

[22] Filed: Apr. 6, 1999

[30] Foreign Application Priority Data

May 7, 1998 [DE] Germany ............................ 198 20 377

[51] Int. Cl.$^7$ ................................................ B62D 33/067
[52] U.S. Cl. ........................................................ 180/89.15
[58] Field of Search .............................. 180/89.14, 89.15

[56] References Cited

U.S. PATENT DOCUMENTS

| | | | |
|---|---|---|---|
| 2,846,096 | 8/1958 | Beyerstedt et al. | 180/89.15 |
| 4,304,142 | 12/1981 | Blomstrom | 180/89.15 |
| 4,401,179 | 8/1983 | Anderson | 180/89.15 |
| 5,060,742 | 10/1991 | Kuhlmann et al. | 180/89.14 |

FOREIGN PATENT DOCUMENTS

| | | |
|---|---|---|
| 0 422 489 | 7/1993 | European Pat. Off. . |
| 30 07 074 | 9/1981 | Germany . |
| 39 28 945 | 9/1991 | Germany . |
| 42 14 219 | 12/1994 | Germany . |

*Primary Examiner*—Kenneth R. Rice

[57] ABSTRACT

An agricultural or industrial utility vehicle includes a vehicle body, an operator's platform and a pivot assembly, by means of which the operator's platform can be pivoted on the utility vehicle about an essentially horizontal pivot axis. The pivot assembly includes at least two guide arms of differing lengths and/or extending in non-parallel directions. Each guide arm has one end which is coupled at a joint to the operators platform and another end which is coupled at another joint to the vehicle body. The connecting joint axes of the guide arms are essentially parallel to each other and are spaced apart from each other. Such a pivoted operator's platforms permits access for maintenance, repair or cleaning of vehicle components which are arranged under the operator's platform.

14 Claims, 2 Drawing Sheets

PIVOT ASSEMBLY FOR A VEHICLE CAB

BACKGROUND OF THE INVENTION

This invention relates to an agricultural or industrial utility vehicle with a vehicle body, an operator's platform and a pivot assembly which pivotally couples the platform to the vehicle so that the platform can be pivoted about an essentially horizontal pivot axis.

Operator's platforms (with or without cab) can be installed on agricultural or industrial utility vehicles so as to be pivoted or removable, in order to permit access for purposes of maintenance, repair, replacement or cleaning of vehicle components that are arranged underneath the operator's platform. Since pivoting or removal of operator's platforms usually requires cranes or block and tackle arrangements, such operations must be performed in shop areas or in locations that are equipped with such arrangements. Frequently, disassembly of further components is necessary in order to permit pivoting in the first place. The design shown in EP-A-0 422 489, for example, requires the dismounting of a rear wheel in order to permit pivoting sideways of the operator's platform.

DE-OS-30 07 074 shows an agricultural and/or construction utility vehicle with a power lift equipped with two lower guide arms and a cab that can be disassembled if not used and deposited in a storage location. For the disassembly the cab can be pivoted by means of a push rod about a pivot axis located at the rear end of the tractor. On the one hand, the push rod is connected in a joint to the lift arm in the lowest position of the power lift and on the other hand rigidly attached to a pivot lever rigidly connected to the operator's cab. When the lift arm is raised into is highest position the operator's cab is pivoted only so far that its center of gravity remains ahead of the pivot axis. In this intermediate position the operator's cab can be brought manually into a storage position in an appropriate storage location. In this arrangement there is no provision for retaining the cab in a pivoted position. This has the disadvantage that the cab must always be removed as a complete unit and deposited at an appropriate storage location. The operator's platform itself with the operating components and operator's seat remain on the tractor. This is not an absolute requirement for the performance of maintenance and repair operations.

It is also known to provide trucks with operator's platforms or cabs which are pivotal towards the front about a horizontal pivot axis. Such designs are usually not applicable to agricultural or industrial vehicles because their operator's platform are arranged in the rear region of the vehicle, and because components such as fenders might interfere with the pivoting process.

SUMMARY OF THE INVENTION

An object of the present invention is to provide a utility vehicle with a simple system for pivoting the operator's platform to facilitate maintenance and repair and installation while avoiding the noted disadvantages and problems.

A further object is to provide a pivot assembly which consists of a few components that can be manufactured at low cost and that can be installed easily.

A further object is to provide a pivot assembly which enables a free pivoting of the operator's platform without any vehicle components hindering the pivoting process.

These and other objects are achieved by the present invention, wherein a utility vehicle includes a vehicle body, an operator's platform and a pivot assembly for pivoting the operator's platform on the vehicle about an essentially horizontal pivot axis in order to gain access to vehicle components located underneath the operator's platform for purposes of maintenance or repair operations. The pivot assembly includes at least two guide arms of differing lengths and/or oriented in differing, nonparallel directions. Each arm having one end coupled at a joint to the operator's platform and having another end coupled at a joint to the vehicle body. The joints have axes which are generally oriented parallel to each other and are spaced apart from one another. It should be understood that the arms could be coupled to directly to the vehicle body and/or the operator's platform or indirectly through other components attached thereto.

This pivot assembly makes possible a simple and rapid pivoting of the operators platform or the operator's cab, without dismount further components of the vehicle such as, for example, a rear wheel. Since no cranes or block and tackle arrangements are required, the pivoting need not be performed in a shop, but may be performed, if desired, at any location, for example, in the field. The cab can be secured in its pivoted position. This assures sufficient access to vehicle components arranged underneath the operator's platform. The pivoting angle made possible by the arrangement and the height of pivoting permit all vehicle systems to remain connected and operable. For example, lines for the air conditioning system, the heating system, the steering, the brakes, the hydraulic components and further electrical and hydraulic lines can be designed and routed in such a way that they need not be separated for the pivoting. The lines can be routed in the rear region of the vehicle and be provided with sufficient flexibility that they make possible pivoting over the full pivoting angle.

The two guide arms interact as a four-bar linkage so that the operator's platform pivots and moves linearly. By establishing the lengths, direction and position of the axes of the connecting joints of the guide arms, the pivoting path and the possible range of the pivot angle of the operator's platform can be varied within wide limits and made to conform to the available space. The pivoting movement assures that, during the entire pivoting process, an adequate distance is maintained between the operator's platform and the components of the utility vehicle. This is particularly advantageous if fenders for rear tires of the utility vehicle are fastened to the operator's platform. The invention assures that, during the pivoting of the operator's platform, the fenders do not collide with the tires, so that pivoting is possible without dismounting of the tires. The pivoting movement of the operator's platform can be described as a pivoting about an imaginary center of rotation whose position changes continuously during the pivoting process and that represents an intersection of imaginary extensions of the guide arms. If the pivoting angle is limited by the lengths of. the guide arms and the locations of the joints of the guide arms in such a way that the center of gravity of the operator's platform does not move to the outside beyond the pivot axis, then single-acting hydraulic cylinders can also be used since the weight of the operator's platform brings it again into its initial position.

Since the pivot assembly as such consists of few and simple components, it can be manufactured easily and at low cost. A simple assembly and disassembly of the pivot assembly to the utility vehicle and the operator's platform is possible, since for this purpose only the two guide arms need to be connected to the vehicle body or the operator's platform. Instead of connecting the guide arms directly to the vehicle body or the operator's platform, they may be connected through further components fastened to the vehicle body or the operator's platform.

A power motor arranged between two elements of the four-bar linkage (vehicle body, guide arm, operator's platform) helps to pivot the heavy operator's platforms. Such a power motor may be used exclusively for driving the pivot assembly. However, it is particularly advantageous to utilize a power motor for the pivoting which is already used for other purposes and attached to the utility vehicle. The power motor may, for example, be a linear drive such as a hydraulic motor, a spindle drive or an electric motor or the like.

Preferably the power motor is a hydraulic motor, and the necessary hydraulic pressure may be supplied by a hydraulic pump which is already available on the vehicle for supply hydraulic pressure to other systems, such as steering, hydraulic brakes or similar units. The hydraulic motor may also be supplied by a separate pressure source independent of the vehicle, such as, a manually-operated pump, a hydraulic pressure reservoir or an electrically driven external hydraulic pump. In this case the vehicle's existing hydraulic pressure source need not be used to pivot the operator's platform, and the operator's platform may be pivoted even when the vehicle pressure source is not operating.

The hydraulic motor may be a single-acting or a double-acting piston and cylinder unit. With an external pressure supply of a single-acting hydraulic motor, the lowering of the operator's platform occurs when the connection between the pressure source and the hydraulic motor is interrupted. Preferably, the hydraulic fluid would be released via a throttle, so that a uniform and not too rapid lowering of the operator's platform can be achieved.

Preferably, a single pin can be used to couple the power motor, the first guide arm and the operator's platform to each other. Utility vehicles are frequently provided with a hitch to which implements or loads can be attached. A typical hitch includes two hydraulically actuated lift arms which are pivotally coupled to the vehicle body and which can be raised and lowered by associated lower guide arms. Such a lift arm can be coupled to the operator's platform or to a component attached to the operator's platform. By using the lift arm as the first guide arm of the pivot assembly, another existing component can be utilized for a second function so that the number of components is reduced. The lift arm may be pivoted by a single-acting piston and cylinder device that actuates two hitch lift arms through a lift shaft.

A lift link is coupled between a free end of the lift arm and the lower draft links of the hitch. The threepoint hitch also includes upper links coupled to the vehicle body (for example, see ISO 730-1). The connecting joint between the lift arm and the operator's platform is located in a central region of the lift arm, while the lifting rod or lifting spindle engages a free end of the lift arm. Preferably, the hitch lift cylinder is utilized as the power motor, and it can also be coupled to the central region of the lift arm of the hitch, so that a common pin connects the lift cylinder, the operator's platform and the lift arm to each other. Since in known hitches, the lift arm and the lift cylinder are coupled by pins, an elongated pin can be used to accommodate the lift assembly. In order to move the horizontal pivot axis into the farthest possible rear region of the vehicle or even into a region outside of the vehicle, it is advantageous to fasten a horizontally extending strut to the operator's platform. A first guide arm can be coupled to a central region of the strut and a second guide arm can be coupled to the free end of the strut. This design permits good access to components located underneath the operator's platform with a relatively small pivot angle. Preferred pivot angles lie between 20 and 55. Small pivot angles are frequently sufficient for purposes of maintenance or for the replacement of small units, so that a complete pivoting of the operator's platform is necessary only for larger repairs or for extensive maintenance operations.

The struts may be rods which can be inserted very simply into corresponding openings in a frame of the operator's platform and fastened thereto, thus avoiding costly connecting and fastening devices.

In view of the heavy weight of the operator's platform a pivot assembly is preferably provided on each side of the utility vehicle. The corresponding axes of the connecting joints of the guide arms are aligned with each other. In this case, the lift arms of the known hitch can be utilized, since they are supported in bearings on a common lifting shaft, free to pivot. A hydraulic motor is coupled to a central region of each lift arm, and the hydraulic motors are supplied with hydraulic pressure by a common pressure source.

The pivot assembly includes at least one strut and one guide arm. The strut is connected to the guide arm, free to rotate, and can be connected rigidly to the operator's platform. The strut is coupled to a power motor and to a further guide arm which can be pivotally connected to the vehicle body. Such a pivot assembly may be attached permanently to the vehicle. However, it is particularly advantageous if the pivot assembly can be attached simply and rapidly to the utility vehicle and then disassembled similarly after the completion of maintenance and repair operations, so that the pivot assembly does not hinder the normal operation of the vehicle and so that it cannot be damaged in rough operating conditions. The position of the connecting joints of the pivot assembly can be varied so as conform to various vehicle or model types that have varying dimensions. The connecting points can be provided by movable or interchangeable retainers or other removable components attached to the strut or the guide arms.

If the power motor and the further guide arm are components of a hitch, the number of components of the pivot assembly that must be attached to or disassembled from the pivot assembly is reduced further. The one guide arm can be connected to the free end of the strut, free to rotate. The power motor and the further guide arm are coupled to a central region of the strut in order to improve the pivot axis of the operator's platform.

The invention can also be applied to agricultural and non-agricultural tractors, other agricultural vehicles, such as combines, forage harvesters and other harvesting machines, and to industrial vehicles such as loaders, dredges or cranes.

DESCRIPTION OF THE PREFERRED EMBODIMENT

Figure 1:
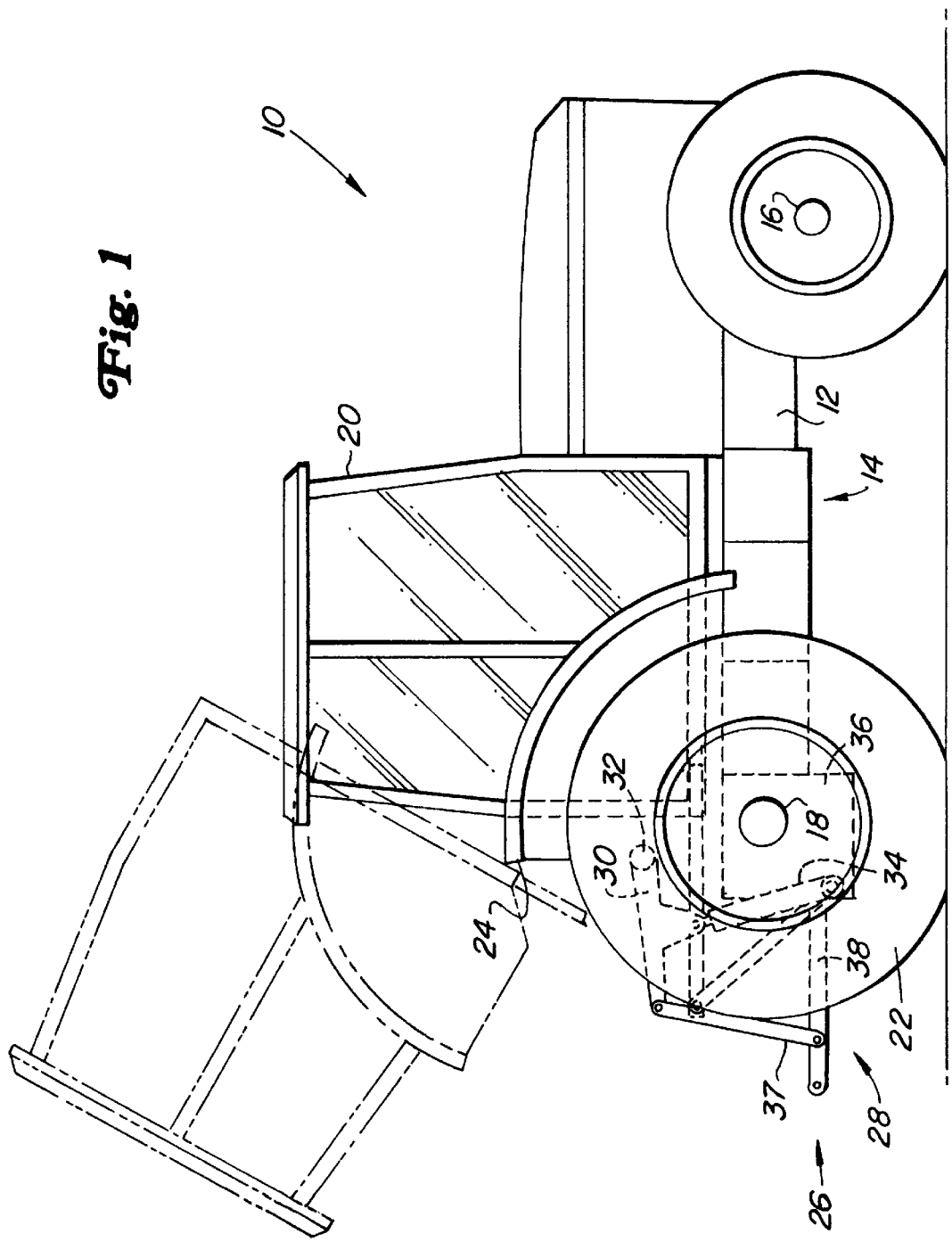
FIG. 1 is a side view of a vehicle according to the invention with a pivoted operator's platform and a pivot assembly in normal position and in fully pivoted position (dashed lines).

FIG. 1 shows an agricultural tractor 10 with a frame 12 in which an engine and gearbox 14 and various other vehicle components (not shown) are mounted. A front axle 16 and a rear axle 18 are fastened to the frame 12. In the region of the rear axle 18 an operator's platform 20 in the form of a cab is mounted on the frame 12. Fenders 24 are fastened on both sides of the vehicle 10 to the operator's platform 20.

Figure 2:
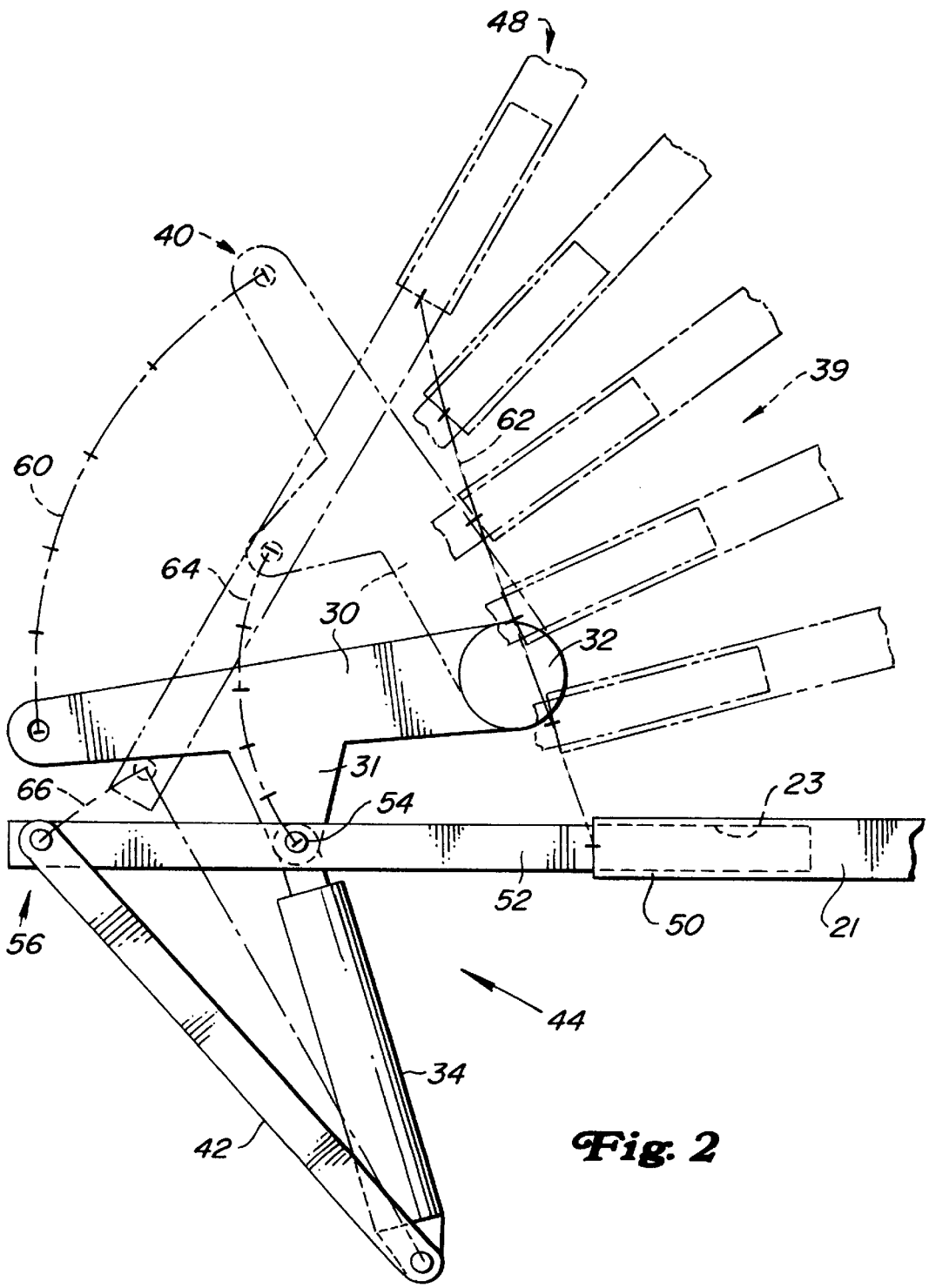
FIG. 2 is a schematic side view of the pivot assembly of FIG. 1 showing its initial position (solid lines) and several pivoted positions (dashed lines).

An implement hitch 28 is mounted at the rear side 26 of the vehicle 10 (with respect to its direction of operation). Since the hitch 28 is symmetrical about a longitudinal centerline of the vehicle 10, only its components on the right side will be described in detail in the following. The hitch 28 includes a first guide arm or lift arm 30 which is coupled to lift shaft 32. The lift shaft 32 is rotatably supported or mounted in the vehicle body 36 by bearings (not shown), so that the lift arm 30 is pivotally coupled to the vehicle body. At a central region of the lift arm 30 a side leg 31 is provided, to which a power motor 34, in the form of a single-acting piston and cylinder arrangement, is connected at a joint formed by a pin connection. The other end of the power motor 34 is connected in a joint to a differential housing, that is part of the vehicle body 36 of the utility vehicle 10. The lower guide arms 35 and the lifting rods 37 of the hitch are configured in conventional manner. For the sake of clarity the upper guide arm is not shown in the drawing in any further detail. As shown in FIG. 2, the lift arm 30 moves from an initial lower position 38 over several intermediate positions to an upper end position 40 when the hydraulic motor 34 is extended.

The operators platform 20 includes a four-sided frame. The two lower elements 21 at the sides of the frame that extend in the longitudinal direction of the vehicle have slots 23 which are open to the rear. A strut 52 configured as a profiled rod is inserted into each of these slots 23. The outer shape of the strut conforms to the shape of the slots 23. If necessary the struts 52 can be fastened in a simple manner to the frame for easy assembly or disassembly. To secure the struts 52 to the frame conventional pin connections can be used (not shown).

A link 42 is pivotally coupled to a free end of each strut 52 at a joint 56. The joint may be configured as a pin connection that can be easily connected and disconnected, in which the strut 52 and the link 42 are each provided with an associated bore through which a pin is inserted that is secured by appropriate retaining elements. The other end of the link 42 is connected in a joint to the differential housing 36. For this joint a pin connection may also be provided, in which a pin can be fastened to the differential housing 36 which is inserted through a bore in the link 42 and makes possible a simple assembly and disassembly of the link 42. The pin used here is preferably the same pin that usually forms the joint between the hydraulic motor 34 and the differential housing 36. If necessary, the pin used here previously may have to be replaced by a longer pin, so that the link 42 can be added to the assembly.

The central region of the strut 52 is connected through a joint 54 with a side leg 31 which projects downwardly from the lift arm 30. For this purpose the strut 52 is provided with a bore which receives a pin. This pin is the same pin that couples the lift arm 30 with the hydraulic motor 34. In contrast to previous commonly used pins, the pin used here is an extended length pin, which extends through the bore of the strut 52. Appropriate rapid release retaining elements (not shown) may be used to secure the pin to the strut 52.

As long as the two struts 52 and the two links 42 are not permanently fastened to the vehicle 10, then the vehicle 10 does not differ to a notable degree from a conventional tractor with hitch. For the pivoting of the operator's platform 20, the struts 52 and the links 42 are fastened to the vehicle in the manner shown and described. Furthermore, attaching elements, that secure the operator's platform 20 to the vehicle body 36 are released. If the power motors 34 are supplied with pressurized hydraulic fluid and are extended, the forward part of the operator's platform 20 is raised from the vehicle body 36, permitting access to vehicle components located underneath the operator's platform 20.

The struts 52, the links 42 and an electric or manually operated external hydraulic pump can be assembled and held as separate unit, so that it can be fastened to the vehicle if necessary in order to pivot the operator's platform 20. For the hydraulic drive of the hydraulic pump a "T" fitting (not shown) may be provided in the hydraulic circuit of the power motors 34, the central connection of the "T" is connected over a shut-off valve with a hydraulic coupling (not shown).

It should be emphasized that it may be necessary to release or disconnect the electric and hydraulic connecting lines and mechanical linkages extending between the operator's platform 20 and the vehicle body 36 before the pivoting operation. There is a particular advantage, however, in designing and arranging the brake lines, the steering lines, the heater lines, the lines of an air conditioning system and further electrical and hydraulic lines as well as any necessary connecting linkages (not shown) in such a way that they do not have to be opened for a pivoting operation. For this purpose portions of the lines, in particular, those in the rear region of the operator's platform 20 are routed transverse to the direction of operation. Aside from the saving in maintenance time, the ability to keep the lines connected has the advantage that the prime mover can continue to operate with the operator's platform 20 pivoted. Thus, a hydraulic pump can also be driven so as to supply the power motors 34 with hydraulic fluid. The lift arm 30 of the attaching arrangement 28 forms a pivot assembly 44 together with a second guide arm or link 42, by means of which the operator's platform 20 can be brought from its initial position in contact with the vehicle 10 (the solid lines in FIG. 2) over intermediate positions (shown with dashed lines) into a pivoted end position 48. In order to pivot the operator's platform 20 the power motor 34 must be extended. Thereby the lift arm 30 moves along the dashed line 60 into its upper end position 40. The operator's platform 20 connected to it in a joint is thereby also raised. Since the operator's platform 20 is connected in a joint to the vehicle body 36 through the link 42 with constant length, the operator's platform 20 performs a pivoting movement about an imaginary pivot axis. The position of this pivot axis is a result of the geometry of the individual components of the pivot assembly 44, that is, the location of the connecting joints and the lengths of the lift arm 30, the link 42 and the strut 52.

In addition to the initial position and the final pivoted end position 48 of the operator's platform 20 in FIG. 2, several intermediate positions 39 are shown in dashed lines. During pivoting the lift arms 30 and the links 42 pivot about each of their connecting joints at the vehicle body 36. During pivoting the connecting joint 54 between the strut 52 and the lift arm 30 moves in a circular path 64, whose center form the axis of the lifting shaft 32. The connecting joint 56 between the strut 52 and the link 42 moves in a circular path 66 whose center forms the connecting joint of the link 42 on the vehicle body 36. Since the distance between the two aforementioned connecting joints 54, 56 remains constant, the result is that the operator's platform 20 both translates (at an angle upward and to the rear) and pivots, so that the rear point of the frame of the operator's platform 20 moves along the curve 62. Preferably, two essentially identical pivot assemblies are provided, and they have corresponding connecting joint axes which are aligned with each other.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a vehicle having a body, an operator's platform and a pivot assembly which pivotally couples the operator's platform to the vehicle about a generally horizontal pivot axis, the pivot assembly comprising:

a pair of guide arms having differing lengths and which extend in non-parallel directions, each guide arm having one end coupled at a first joint to the operator's platform and having another end coupled at a second joint to the vehicle body, said joints having axes which extend generally parallel to each other and which are spaced apart from each other; and an implement hitch having a lift arm coupled to the vehicle body, the lift arm comprising a first guide arm of the pivot assembly, the lift arm being coupled to the operator's platform by a connecting joint.

2. The vehicle of claim 1, further comprising:

a power motor coupled between the vehicle body and one of the guide arms, the motor being operable to pivot the operator's platform.

3. The vehicle of claim 1, further comprising:

a power motor coupled between the vehicle body and the operator's platform, the motor being operable to pivot the operator's platform.

4. The vehicle of claim 2, wherein:

the power motor comprises a hydraulic motor.

5. The vehicle of one of the claim 2, wherein:

the power motor and the guide arm are coupled together at a first joint, and the power motor and operator's platform are coupled together at a second joint, and the first and second joints have axes which are aligned with each other.

6. The vehicle of one of the claim 2, wherein:

the power motor and the guide arm are coupled together at a first connecting joint, and the power motor and the guide arm are coupled together at a second connecting joint, and the first and second connecting joint have axes which are aligned with each other.

7. The vehicle of claim 5, wherein:

a common fastening element couples the first guide arm, the power motor and the platform to each other.

8. The vehicle of claim 1, wherein:

the lift arm having a free end coupled to a lifting strut of the hitch, and having a central region coupled to the operator's platform.

9. The vehicle of claim 2, wherein:

a strut is attached to and extends away from the operator's platform to a free end;

a first arm is coupled to a central region of the strut; and a second arm is connected to the free end of the strut.

10. The vehicle of claim 9, wherein:

the strut comprises a rod which can be inserted into a frame component of the operator's platform and fastened thereto.

11. A pivot assembly for pivotally coupling an operator's platform to a body of a utility vehicle, characterized by:

a strut connected rigidly to the operators platform;

a first guide arm rotatably coupled to the strut;

a power motor coupled to the strut; and a second guide arm coupled to the strut and pivotally coupled to the body.

12. The pivot assembly of claim 11, wherein:

the power motor and the second guide arm are components of an implement hitch which is attached to the utility vehicle.

13. The pivot assembly of claim 11, wherein:

the strut comprises a rod which can be inserted into and fastened to a component of a frame of the operator's platform.

14. The pivot assembly of claim 11, characterized by:

the first guide arm is coupled to an end of the strut; and the second guide arm is coupled to a central region of the strut.

* * * * *